United States Patent
Chefalas et al.

(10) Patent No.: US 6,856,979 B1
(45) Date of Patent: Feb. 15, 2005

(54) EVALUATION OF EXPRESSIONS USING RECURSIVE SQL

(75) Inventors: Thomas E. Chefalas, Somers, NY (US); Alexei A. Karve, Peekskill, NY (US)

(73) Assignee: International Business Machines Corporation, Armonk, NY (US)

( * ) Notice: Subject to any disclaimer, the term of this patent is extended or adjusted under 35 U.S.C. 154(b) by 689 days.

(21) Appl. No.: 09/652,930

(22) Filed: Aug. 31, 2000

(51) Int. Cl.⁷ .................................................. G06F 5/02
(52) U.S. Cl. ............................................. 706/47; 707/1
(58) Field of Search ............................... 706/47; 707/1, 707/3, 5, 8

(56) References Cited

U.S. PATENT DOCUMENTS

| | | | |
|---|---|---|---|
| 2002/0049749 A1 * | 4/2002 | Helgeson et al. | 707/3 |
| 2002/0073080 A1 * | 6/2002 | Lipkin | 707/3 |
| 2003/0097357 A1 * | 5/2003 | Ferrari et al. | 707/3 |
| 2003/0130994 A1 * | 7/2003 | Singh et al. | 707/3 |
| 2003/0177111 A1 * | 9/2003 | Egendorf et al. | 707/3 |

* cited by examiner

Primary Examiner—Wilbert L. Starks, Jr.
(74) Attorney, Agent, or Firm—F. Chau & Associates, LLC

(57) ABSTRACT

The present invention is directed towards a system and method for delivering client content. The system compares a plurality of client properties with a plurality of properties stored in a content server and determines a plurality of Boolean expressions. The system evaluates the expressions according to a recursive SQL query to retrieve applicable qualifying rules. Further, the system supplies an action associated with the applicable qualifying rules to a client. The actions allow client content to be automatically updated from a FTP server.

17 Claims, 7 Drawing Sheets

Flowchart for performing rule evaluation

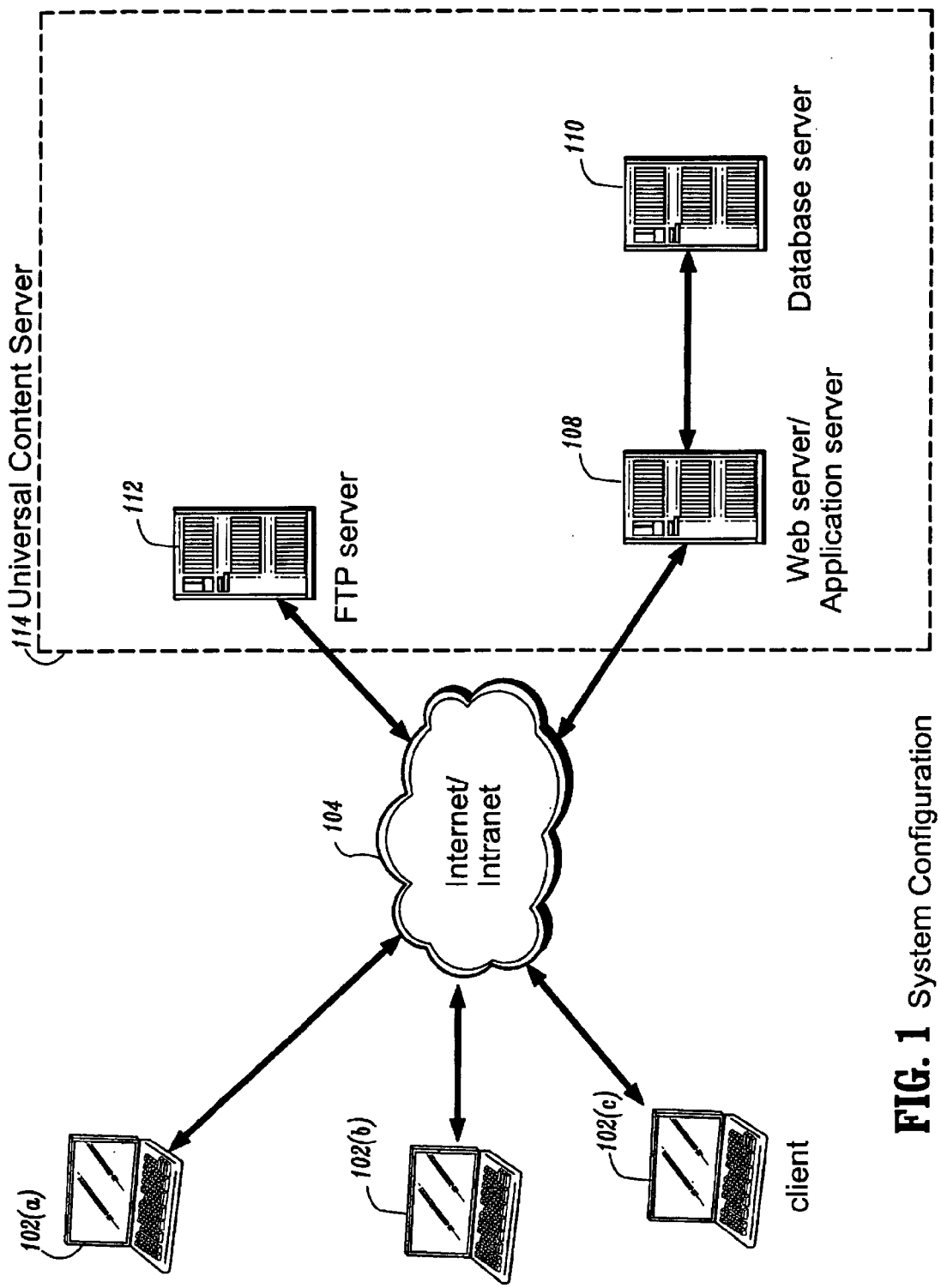
FIG. 1 System Configuration

MODEL_NUMBER=2134C21
PRELOAD_VERSION=NTIT400
BIOS_VERSION=MOKT15AU

FIG. 2 Example Name/Value pairs generated by the client

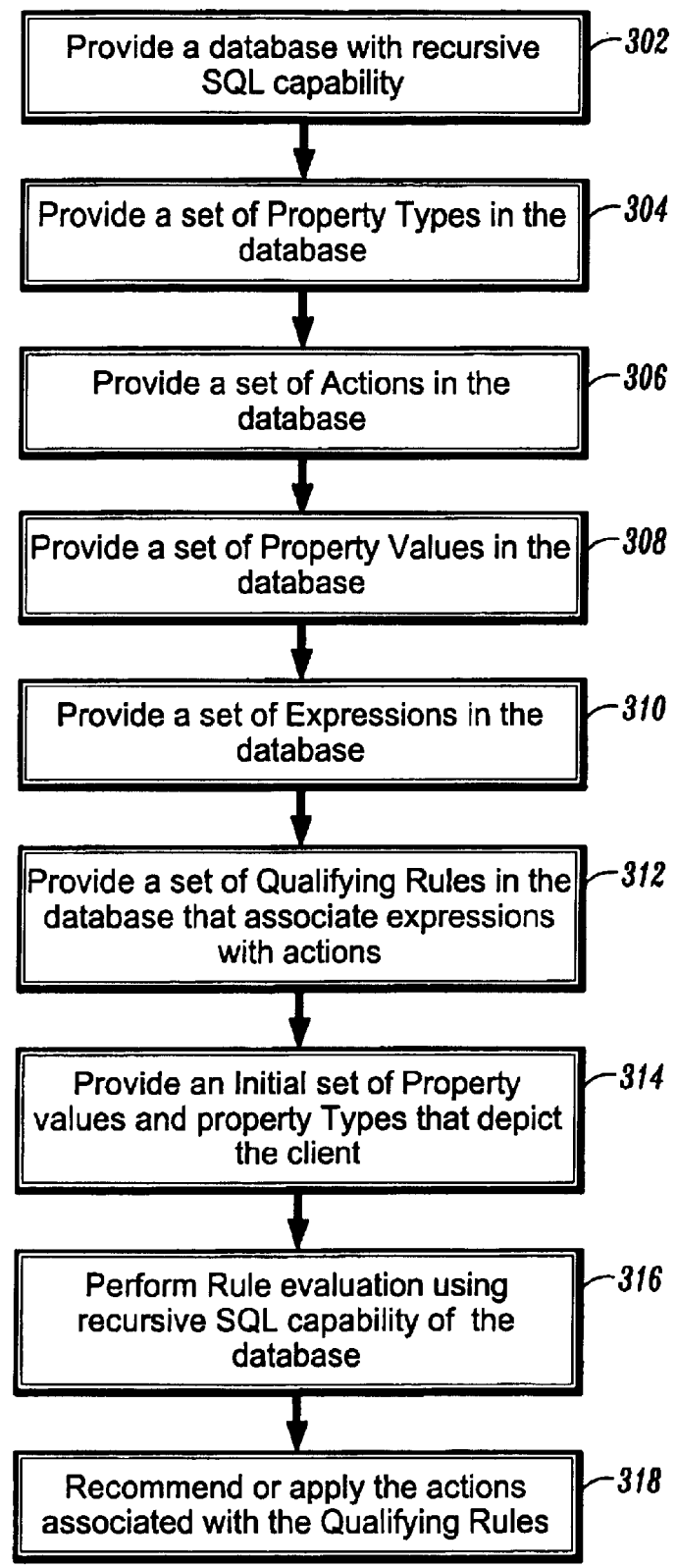
FIG. 3 Flowchart for performing rule evaluation

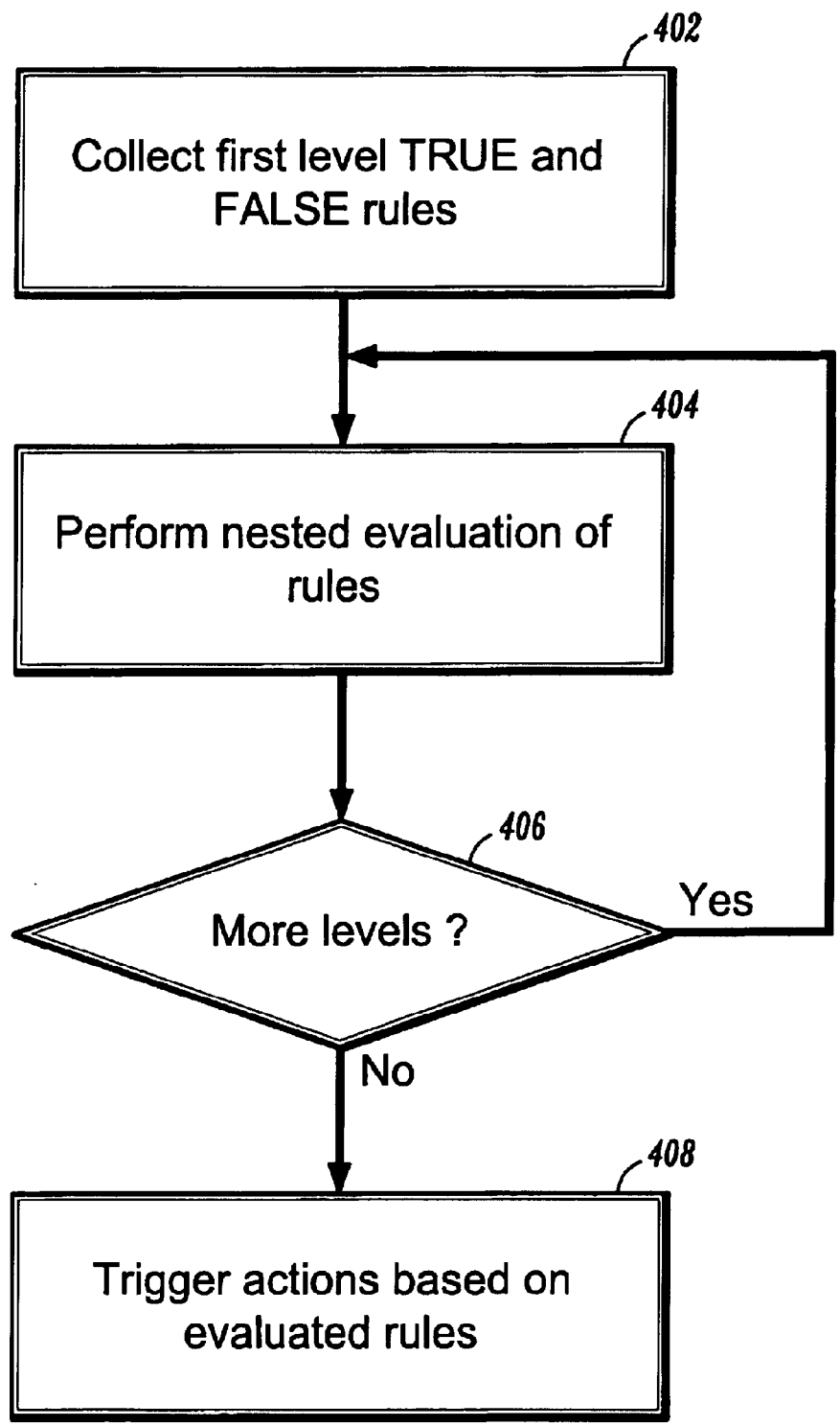
FIG. 4 Flowchart to Retrieve Qualifying Rules

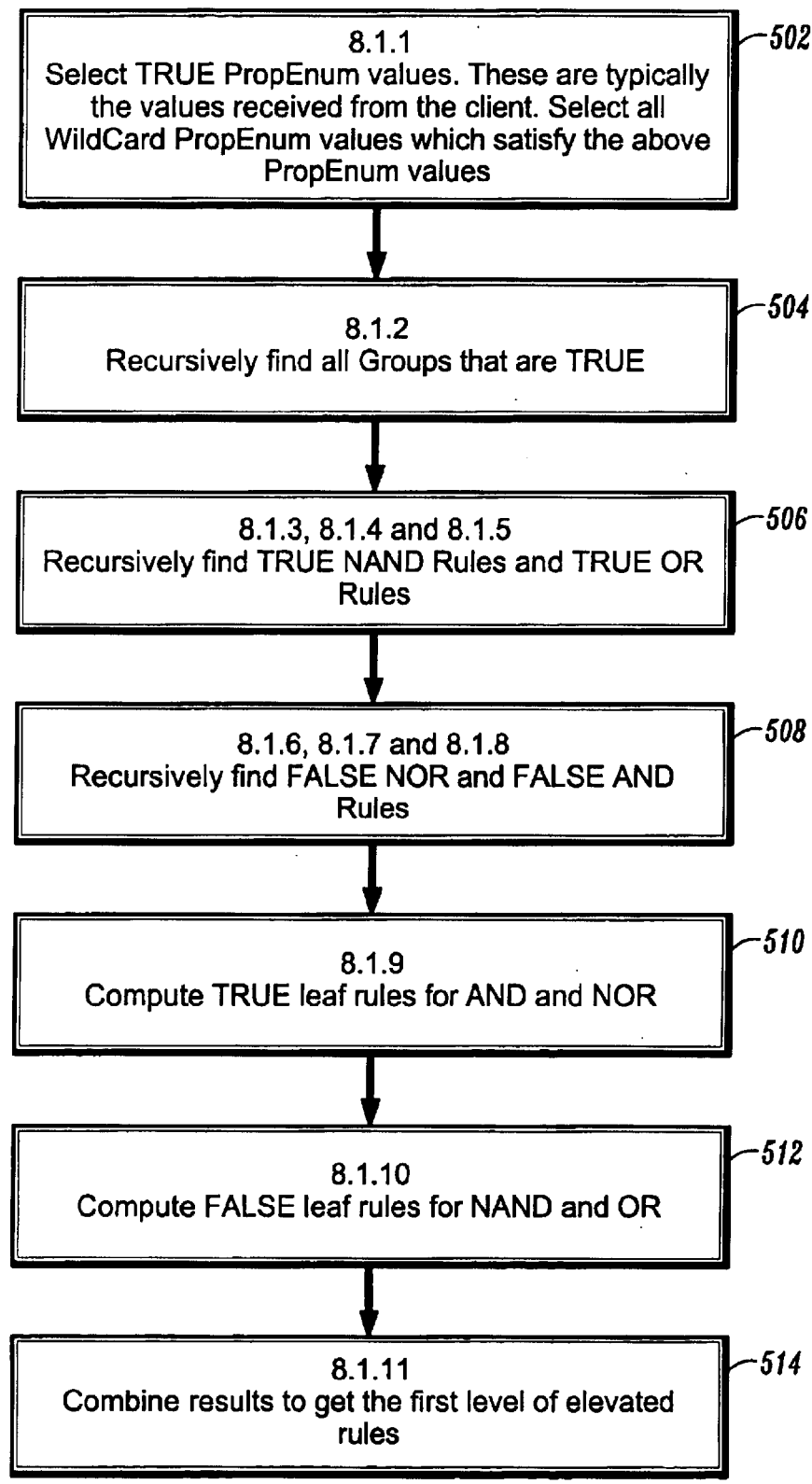
FIG. 5 Flowchart to collect first level TRUE and FALSE rules

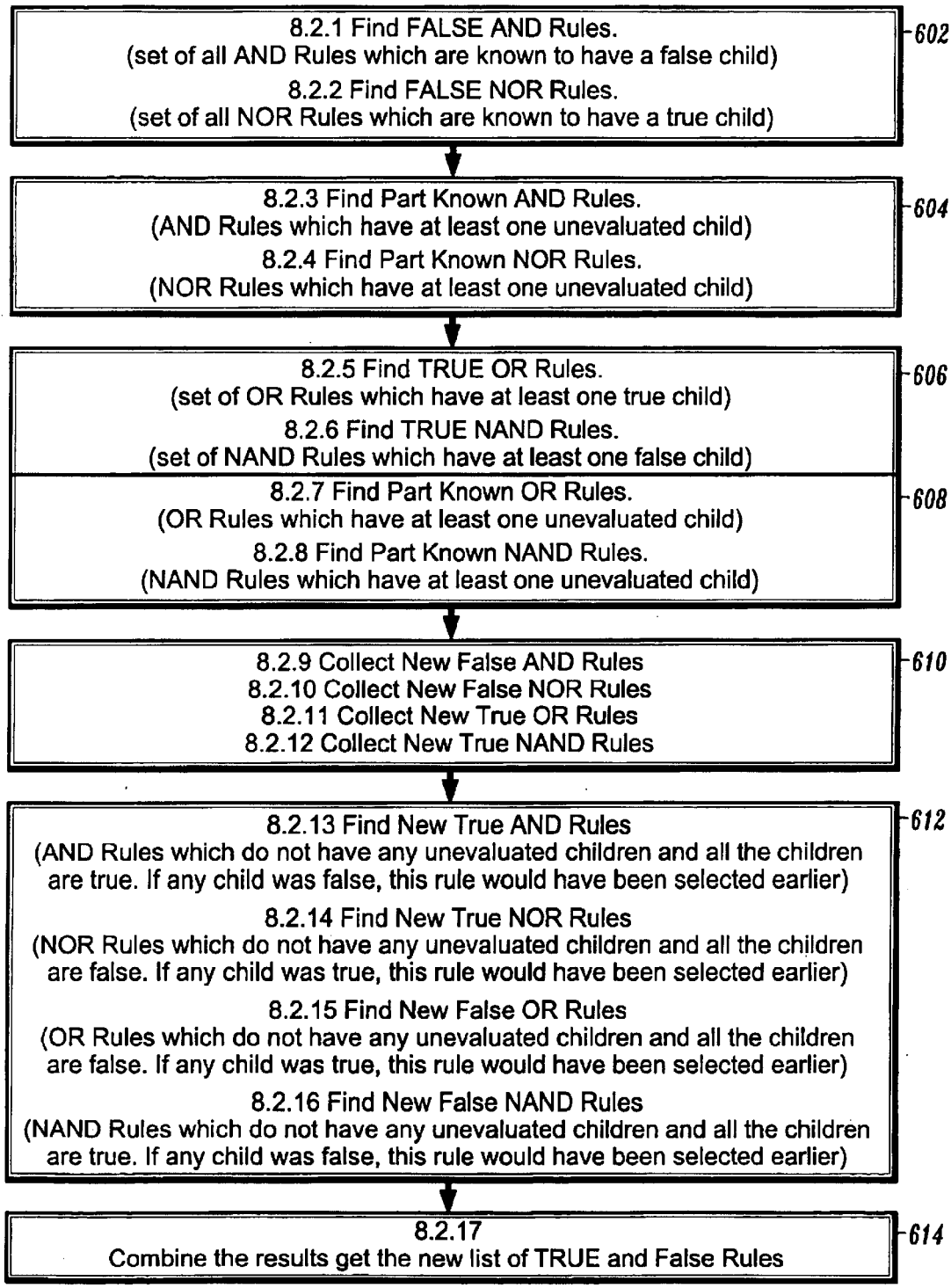
FIG. 6 Flowchart to evaluate further levels of rules

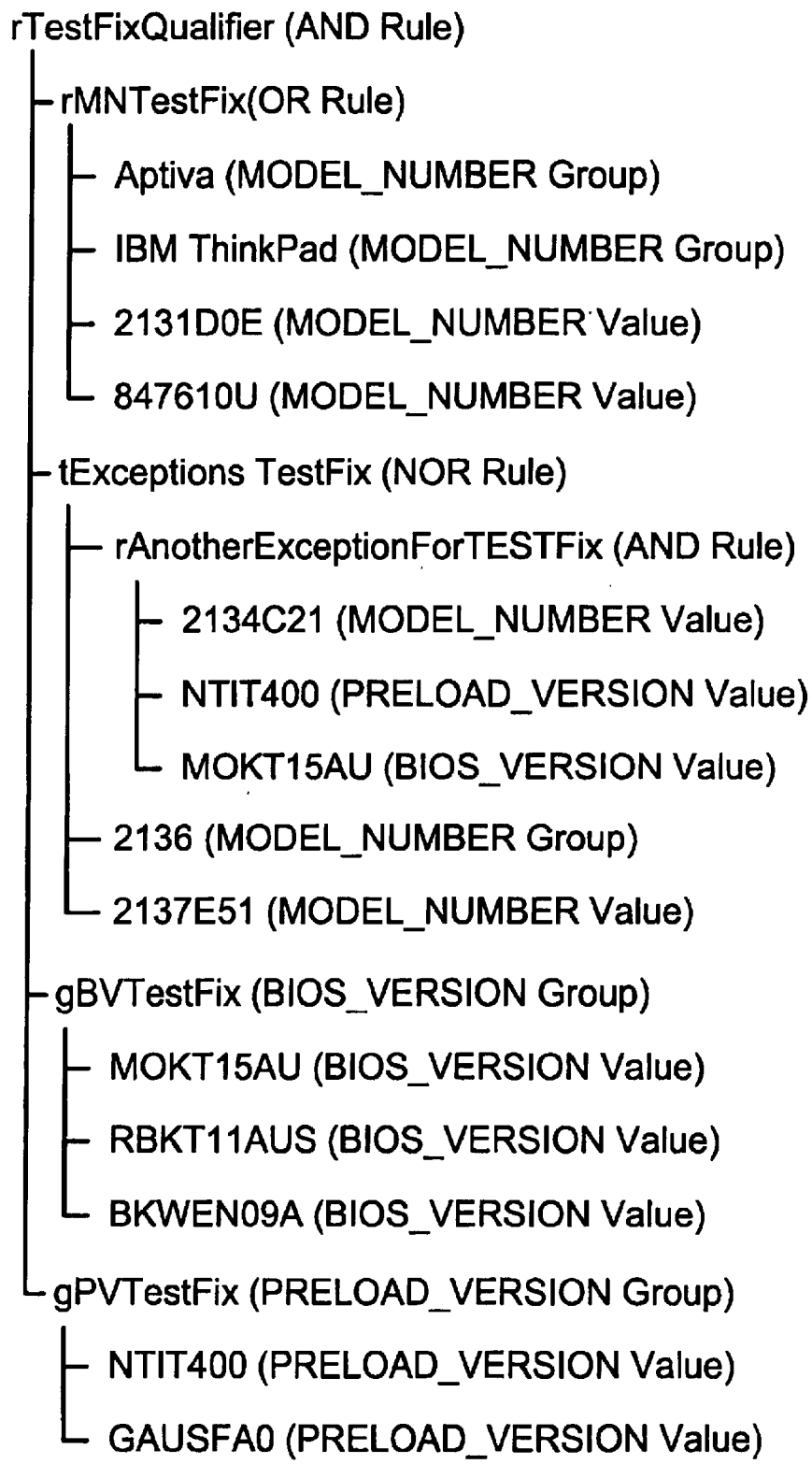
FIG. 7 An example of a rule tree

EVALUATION OF EXPRESSIONS USING RECURSIVE SQL

BACKGROUND OF THE INVENTION

1. Field of Invention

The present invention relates generally to the field of computer system management, and in particular, to the automated management of electronic content in a client system from a vendor.

2. Description of Related Art

In managing a computer system, a major problem is keeping abreast of rapid changes in the electronic content. For example, with regard to software, by the time a customer first boots up a software onto the machine, it is likely that an upgraded release of the software is already available. However, although updates are available, oftentimes the customer is not aware of the availability of the updates, or if this is known, it may not be easy for the customer to determine which update to select or whether it is necessary to acquire the update. Furthermore, if it can be determined that something should be updated, it can be time-consuming and frustrating to traverse various customer property values represented in an accessible electronic form in the client's computer system, e.g., computer software, publications in electronic format, hardware, and communications specifications. In the present context, property value is synonymous with the electronic content of the computer system.

Current customer support systems do a textual search of documents using specific keywords or wild cards to find upgrading information. Other systems compare user inventory data to data stored in a database and analyze the user inventory by bringing the data entries that map computer software updates and fixes to inventory, from the database into an application program or service as needed.

U.S. Pat. No. 5,845,077 mentions that software updates and fixes are determined by comparisons of inventory against database entries containing information about computer software available on the update service computer. This approach is limited to the comparison of specific software.

U.S. Pat. No. 5,742,829 determines new programs by comparing a specific set of properties such as build number, operating system and natural language from within the client setup executable. However, this method is limited to a specific set of hard coded properties or actions. U.S. Pat. No. 5,446,885 describes a rule-based application structure which uses the relational database to store rules and the logic programs needed by the system to execute the rules. The evaluation is done by the program and may need excessive amounts of communication to accomplish a task.

U.S. Pat. No. 5,675,784 describes a data structure for collecting component and specification level data related to products and uses a relational database system to search products based on component criteria. However, the system does not allow for links between components and actions, where the links are stored and evaluated within the database.

Therefore, the need exists for a system and method of determining a client's needs using a SQL object relational database management system to recursively evaluate dependency rules relating to client content.

SUMMARY OF THE INVENTION

As noted previously, the problem addressed by the present invention is the problem faced by users in determining the electronic content suitable for upgrading their machines. In a typical scenario, a user interested in upgrading content has to search the Internet and manually browse through redundant information as the information is returned by a textual search.

Specific problem addressed by the invention: When a client user has problems with some components of his computer system, traditionally s/he calls the Help Center to resolve the problem. Once the problem is resolved, the knowledge about the problem and the solution essentially resides with the staff answering the phone calls. If the particular problem is common, i.e., faced by many users, it may result in more phone calls needing the same resolution. The present invention seeks to reduce the number of support phone calls to the Help Center. This can be done by capturing the knowledge about the problem that the client had with his system (or any potential problems discovered after the systems were shipped) through applicability. The problem resolution is determined either manually or automatically and saved electronically. When a client faces a problem there is a high probability that that solution to the problem already exists in electronic form. The client simply needs to contact the Universal Content Server (UCS) server electronically. Actions are determined using the rule evaluation over the applicability rules that were created earlier in the database. An "action" is a recommendation to a client computer system for upgrading property values. These actions will be proactively applied to the client system which would have faced the same problem thus avoiding additional manual overhead and costly phone calls to the Help Center.

As compared to the prior art, the present invention compares property values of components (software or hardware) and is flexible, not limited to the comparison of specific software. Further, the present invention may perform generic evaluations. In addition, the present invention can handle complex dependencies between property values for applicability. The present invention also allows exceptions that disallow an update to be given to the customer. Further, the present invention allows a complex evaluation within the database for any user extensible set of Property types in order to derive a user extensible set of inferences and is not limited to a specific set of hard coded properties or actions. In addition, the present invention includes a generic Rule Engine within the database, and therefore, avoids possible expense penalties associated with communication, for example, to retrieve Rules from a database for the application program. Another advantage of the present invention includes allowing for Rules that link the components to actions. These Rules are stored and evaluated within the database.

In one preferred embodiment of the present invention, a system for determining an action for a client having exhaustive evaluation of logic expressions is disclosed and claimed. The system includes a computer means for performing the evaluation of the logic expressions to determine which logic expressions relate to dependency rules. The system also includes a command language means for recursively evaluating the dependency rules in the absence of a loop construct to determine the action and any properties for further evaluation.

The computer means is a content server further including a first server for storing a file associated with the action, a second server for accepting an SQL query and returning the action to the client, and a third server. The third server is a relational database management system having a recursive capability for determining the action. The first server can be a file transfer server. The second server can be a web server/application server. The third server can be a database server, the database server having classified and mapped actions representative of client content and properties, against which an SQL query is executed where SQL is the command language means.

The client, according to the present preferred embodiment, includes a processor, an adapter means for connecting to a network, and a software means for communicating over the network to the content server.

Further, command language means allows the client to access data in a relational database management system.

In another preferred embodiment of the present invention a method for delivering client content is disclosed and claimed. By comparing client properties with properties stored in a content server, determining true Boolean expressions, evaluating the expressions according to a recursive SQL query to retrieve applicable qualifying rules, and supplying an action associated with the applicable qualifying rules, the method is able to make suitable client content available to a client. Both properties and expressions utilize Boolean operators.

According to the method, retrieving applicable qualifying rules further includes the steps of determining true and false rules from a first level of rules, performing nested evaluation of the determined rules, and determining whether an additional level exists. If an additional level exists the method performs nested evaluation of collected rules from the additional level. Alternatively, if an additional level does not exist, the method selects actions associated with true qualifying rules as based on the evaluated rules.

Further, determining the true and false rules includes additional steps according to the method. The method selects a client's true property values and true property types and determines the true groups recursively. Further, the method determines true NAND groups, true OR rules, and a plurality of true OR rules recursively. In addition, the method determines false NOR rules, false AND rules, and a plurality of false AND rules recursively. The method determines the true base rules for AND and NOR and determines the false base rules for OR and NAND. By compiling the true OR rules and the plurality of false base rules for OR and NAND the method obtains the first level true and false rules.

The method according to the present preferred performs nested evaluation of the determined rules for any additional levels by determining the false AND rules and a plurality of false NOR rules. In addition the method determines part known AND rules, and part known NOR rules. The method further determines the true OR rules and the true NAND rules, as well as, determining part known OR rules, and part known NAND rules. The method separately compiles the new false AND rules, new false NOR rules, new true OR rules, and new true NAND rules. The method further determines the new true AND rules and new true NOR rules in addition to the new false OR rules and new false NAND rules. Accordingly, by compiling the new false AND rules, the new false NOR rules, the new true OR rules, the new true NAND rules, the new true AND rules, the new true NOR rules, the new false OR rules, and the new false NAND rules, the method obtains new True and False Rules for the additional levels (if any).

In yet another preferred embodiment of the present invention, a method for providing content over a network in response to a SQL query is disclosed and claimed. The method accepts client properties, and compares the client properties with properties stored in a database. The database has recursive SQL capabilities for determining expressions (stored in the database) according to the SQL query. By evaluating the expressions iteratively, the method retrieves applicable qualifying rules, the qualifying rules associating the expressions with a plurality of actions. The actions are recommended, made available, and/or installed on a client.

The step of retrieving qualifying rules according to the method, further includes performing a nested evaluation of rules at each level, and selecting actions based on the evaluated rules.

In still another preferred embodiment of the present invention, a computer program product is disclosed and claimed including a computer usable medium having computer readable program code embodied therein for providing content over a network in response to a SQL query. The computer readable program code in the computer program product includes computer readable program code for causing a computer to accept a plurality of client properties. According to the method, the computer readable program code for causes the computer to compare the client properties with stored properties in a database. The database has recursive SQL capabilities in order to determine expressions (stored in the database) according to the SQL query. Further, computer readable program code for causes the computer to evaluate the expressions iteratively to retrieve applicable qualifying rules. The qualifying rules associate the expressions with a plurality of actions.

According to the method, the actions direct a client to retrieve the content from an FTP server.

BRIEF DESCRIPTION OF THE DRAWINGS

Preferred embodiments of the present invention will be described below in more detail with reference to the accompanying drawings:

FIG. 1. is an illustration of a preferred system configuration according to the present invention;

FIG. 2. shows an example of Name-Values pairs from a client used as input, according to one embodiment of the present invention;

FIG. 3. is a flowchart for performing rule evaluation according to another preferred embodiment of the present invention;

FIG. 4. is a flowchart to retrieve qualifying rules according to yet another preferred embodiment of the present invention;

FIG. 5. is a flowchart to collect first level TRUE and FALSE rules according to one embodiment of the present invention;

FIG. 6. is a flowchart for evaluating further levels of rules according to a preferred embodiment of the present invention; and FIG. 7. shows an example of a rule tree to illustrate one preferred embodiment of the present invention.

DETAILED DESCRIPTION OF THE PREFERRED EMBODIMENT

Using a relational database management system wherein rules linking "what a client has" with "what a vendor provides" are evaluated within the database to provide timely and personalized service and support. Typical examples of the electronic content are software updates and fixes, and electronic documents. With the present invention, the evaluation of the client's computer system is done automatically from the vendor's customer support center to determine what actions in the form of updates and enhancements apply. Thereafter, based on the evaluation, upgraded electronic content is automatically delivered and installed on the customer's computer through an electronic network, such as the Internet.

FIG. 1 illustrates the preferred system configuration for the invention. The embodiment includes client computers 102(a), 102(b), and 102(c). The client computer can be embodied in a laptop computer or other like devices. The client 102 computer has an operating system such as Windows® 95, Windows® 98, Windows NT®, or Linux® and appropriate hardware adapters such as a modem, cable modem, DSL network, token-ring, or ethernet, to connect to the Internet/Intranet 104. The client also has appropriate software drivers installed to enable it to use the TCP/IP communication protocol over the hardware adapters. In addition, the client computer has all the necessary software applications that enable a user to connect to the Internet/Intranet. These applications include a web browser and a dialer. The web browser can be embodied in, for example, Netscape® Navigator® or Microsoft's® Internet Explorer®. A dialer can be embodied in, for example, AT&T's® Global Network Dialer. A user uses the client computer 102 to connect to the Universal Content Server 114 to request updates.

The Universal Content Server includes an FTP Server 112, Web Servers/Application Server 108, and a Database Server 110. These servers can be embodied in IBM® Risc System/6000® computers running the AIX® operating system, or a PC running Microsoft's® Window NT® Server operating system, among others.

Typically a client that needs updates submits HTTP requests to the Universal Content Server. Typical requests may include hello and mycomputer. A hello request can include the ClientName and Version as parameters. The response may include SystemRecognizer and UpdateThyself information. A mycomputer request includes properties discovered for the client system as parameters. The response includes information about updates suitable for the client. Requests from the client are forwarded to Web Server 108. Requests to the Server Application are serviced by the WebSphere Application Server 108 with servlets. A servlet is a small program that runs on a server. Complex queries are executed against the database 110 which result in retrieval of needed actions and relevant information. The client uses this information to retrieve relevant files from the FTP Server 112 and update the client 102(a)–102(c).

The present invention is disclosed in terms of an implementation for providing updates for a computer system, and searching for updates by Content Publishers and Call Takers in an IBM customer support center, this beings the origin of the problem addressed by the invention. However, it will be understood by one skilled in the art that the invention is not limited to this specific application but has a broader scope of application to determine electronic content for any product or system that can be described in terms of its properties and values.

The present invention includes an object relational database management system, wherein elements representative of the electronic content and property values are classified and mapped into a database to provide customer support. In the database, the data structure is represented in a series of tables having relationships that promote consistency, accuracy and ease of use.

Each table has one or more primary keys. A primary key is a column or set of columns that uniquely identifies the rest of the data in any given row. Hierarchical recursions are achieved through nested tables containing parent and child fields pointing to the same element table. In the database, "actions" are associated with Boolean expressions via "dependency rules." Each expression may have an unlimited number of terms. Accordingly, if a Boolean expression evaluated to a "true" for specific set of "client property values", the associated action is deemed suitable for the client.

The Boolean expression is composed of sub-expressions, and the "rule evaluation" of the present invention is the process of evaluating the expressions in order to determine dependency rules for a given set of client property values. In this regard, a property value (with a property type) is any fact that can be discovered about the client's system. The expressions also accommodate the possibility of new property types, i.e., the system is extensible. According to the present invention, each property type belongs to a domain (such as Integer, String, Boolean, Date-Time, Enumerated value, or User Defined Type). Further, the properties utilize Boolean Operators (e.g., AND, OR, NAND, NOR, TRUE, FALSE) which allow the creation of complex expressions with any number of children with Boolean property values. Thus, when a Boolean expression compares a property value of the same type, the result is Boolean. Furthermore, the standard comparison operators (>, <, =, etc.), either allowed by the database or predefined, can be used.

Since the property value for a client is not known until the client's machine has been probed and examined, an expression that uses the property value is not ready to be evaluated. Therefore, although expressions can only evaluate to "true" or "false", the initial value is "unknown".

In the present invention, whenever a Boolean expression evaluates to "true", the method checks to determine whether the Boolean expression belongs to a dependency rule. If it is a dependency rule, then the actions associated with that rule may be made available to the client, or alternatively, automatically installed, because it is suitable for the client. These actions are added to a list of available actions that will be presented to the user. On the other hand, dependency rules associated with Boolean expressions evaluating to "false" are removed from further consideration. Unevaluated dependency rules and expressions are used to determine the set of properties that need to be probed to enable further evaluation by retrieving needed property values. The property values include additional information such as: author, date, process of creation and modification, description of current values, and current status. A user is thus allowed to reuse, share, and clone "groups", "rules", and "actions" which promote efficiency and data integrity.

In accordance with the invention, the method is further described as implemented on an IBM® UCS environment, see FIG. 1. In this environment, the UCS uses the IBM® object-relational database program product DB2®, which supports recursive Structured Query Language (SQL) that is part of the SQL3 standard, to recursively perform the customer's evaluation. The recursion allows for iterative processing in SQL even though there is no loop construct. The "with" construct termed the "common table expression" allows for the creation of a temporary table with new rows that are related to the old rows by operators. The rows are expressions that have been evaluated. When there are no more new expressions to be evaluated, the system stops adding rows to the temporary table.

To initially determine the electronic content of the customer's computer system, the customer's system is probed for a set of Client Property values known to be true. Then the Boolean expressions that evaluate to "true" or "false" are determined at each level of an expression tree. An exhaustive evaluation of Boolean expressions is performed using recursive SQL queries in order to retrieve appropriate actions for the client, thus reducing the communication overhead between the application and the database. Rule evaluation for a given set of property values results in a potential list of actions determined to be suitable for the client and a set of properties necessary for further evaluation.

FIG. 2 shows an example of property/value pair generated at the client and sent to the UCS to determine relevant updates for that client.

FIG. 3 shows the flowchart used by UCS to perform rule evaluation and retrieve relevant actions associated with a client request. The following steps are shown:
1. Provide a database with recursive SQL capability, e.g., DB2® Universal Database 5.2 or above. Step 302.
2. Provide a set of Property Types in the database wherein a Property Type includes for example MODEL_NUMBER, PRELOAD_VERSION, BIOS_VERSION. Step 304.
3. Provide a set of Actions in the database. An example of an action is a recommendation to the client to upgrade a software component. Step 306.
4. Provide a set of Property values in the database wherein the property values are associated with the Property Types. Step 308.
5. Provide a set of Expressions in the database wherein an expression is a symbolic mathematical form. Step 310.
6. Provide a set of Qualifying Rules that associate expressions to actions in the database. Step 312.
7. Provide an initial set of property values and property types provided by a client. Step 314.
8. Compare the initial set of property values and property types with the set of Property Values and Property Types in the database, to evaluate the set of expressions. Iteratively evaluate the set of expressions to retrieve the Qualifying Rules that are TRUE. This step is called Rule evaluation. Step 316.
9. Recommend or apply the actions associated with the Qualifying Rules that are TRUE. Step 318.

FIG. 4 shows the flowchart to retrieve qualifying rules. A rule that qualifies an update is called a qualifying rule. According to FIG. 4, in block 402 the method collects the first level of TRUE and FALSE rules. The method performs nested evaluation of the rules in block 404. The method determines if additional levels of rules exist (block 406), and the nested evaluation is performed for each level. After each level is evaluated, the method triggers actions based on the evaluated rules (block 408).

Rule evaluation is bottom up and results in finding the relevant groups and expressions that are TRUE. The final result is the qualifying rules.

FIG. 5 shows the flowchart to collect first level TRUE and FALSE rules. The sequence of steps is described below.
   8.1 Collect the first level True and False Rules. First level includes any expressions in the database that have a Property value or a Property Group as a direct child of the expression.
      8.1.1 Select True PropEnum Values This is the set of property values and property types probed from the client. Step 502.
      8.1.2 Recursively Find all Groups that are True Groups are nested, therefore property values can occur in groups that are contained in another group. Step 504.
      8.1.3 Find True NAND Rules A NAND expression can be written as P nand Q where P, Q expressions have the form propertyValue, propertyType or groupValue, groupType. This step collects all NAND expressions that have at least one child that is not in the TRUE PropEnum Values (8.1.1) and not in the TRUE Groups (8.1.2) computed above. Step 506.

| P | Q | ... | NAND |
|---|---|-----|------|
| F | F |     | T    |
| F | T |     | T    |
| T | F |     | T    |
| T | T | T   | F    |

8.1.4 Find True OR Rules This step collect all OR Expressions that have at least one child evaluated to TRUE in the TRUE PropEnum values (8.1.1) or TRUE Groups (8.1.2). Step 506.

| P | Q | ... | OR |
|---|---|-----|----|
| F | F | F   | F  |
| F | T |     | T  |
| T | F |     | T  |
| T | T |     | T  |

8.1.5 Recursively Find all True OR Rules This step first combines all TRUE rules found earlier (8.1.3, 8.1.4 and input set of TRUE rules if any), then recursively scans the resultant table for rules contained in nested OR rules. Step 506.
      8.1.6 Find False NOR Rules A NOR expression can be written as P nor Q where P and Q expressions have the form propertyValue, propertyType or groupValue, groupType. This step collect all NOR Expressions that have at least one child evaluated to TRUE in the TRUE PropEnum values (8.1.1) or TRUE Groups (8.1.2). Step 508.

| P | Q | ... | NOR |
|---|---|-----|-----|
| F | F | F   | T   |
| F | T |     | F   |
| T | F |     | F   |
| T | T |     | F   |

8.1.7 Find False AND Rules This step collects all AND expressions that have at least one child that is not in the TRUE PropEnum Values (8.1.1) and not in the TRUE Groups (8.1.2) computed above. Step 508.

| $T_1 = V_1$ | $T_2 = V_2$ | ... | AND |
|-------------|-------------|-----|-----|
| F | F |   | F |
| F | T |   | F |
| T | F |   | F |
| T | T | T | T |

8.1.8 Recursively Find all False AND Rules This step first combines all FALSE rules found earlier (8.1.6, 8.1.7 and input set of FALSE rules if any), then recursively scans the resultant table for rules contained in nested AND rules. Step 508.

8.1.9 Compute all True base or leaf rules for AND and NOR Any of the LeafANDRules (AND expression with at lease one PropEnum or PropGroup as a direct child) and LeafNORRules (NOR expression with least one PropEnum or PropGroup as a direct child) which have not been determined to be false above must be true. This is because all children must be TRUE for AND Expressions and all children must be FALSE for NOR expressions. Step 510.

8.1.10 Compute all False base or leaf rules for OR and NAND Any of the LeafORRules (OR expression with at least one PropEnum or PropGroup as a direct child) and LeafNANDRules (NAND expression with at least one PropEnum or PropGroup as a direct child) which have not been determined to be true above must be false. Step 512.

8.1.11 Combine the results from 8.1.4 and 8.1.10 to get the first level of True and False Rules. Step 514.

FIG. 6 shows the flowchart to evaluate additional levels of rules. The steps are described below.

8.2 Remaining levels of Rules (Nested Evaluation for Rules)

8.2.1 Find All False AND Rules This includes the set of all AND Expressions which are known to have a false child. This table contains all nested AND expressions that are known to have a false subexpression. Since the child is false the parent is false. Step 602.

8.2.2 Find All False NOR Rules This includes the set of all NOR Expressions which are known to have a true child. This table contains all nested NOR expressions that are known to have a true subexpression. Since the child is true the parent is false. Step 602.

8.2.3 Find Part Known AND Rules This includes the AND Expressions which have at least one unevaluated child. Step 604.

8.2.4 Find Part Known NOR Rules This includes the NOR Expressions which have at least one unevaluated child. Step 604.

8.2.5 Find All True OR Rules This includes the set of OR Expressions which have at least one true child. This table contains all nested OR expressions that are known to have a true subexpression. Since the child is true the parent is true. Step 606.

8.2.6 Find All True NAND Rules This includes the set of NAND Expressions which have at least one false child. This table contains all nested NAND Expressions that are known to have a false subexpression. Any false child causes the parent to evaluate to true. Step 606.

8.2.7 Find Part Known OR Rules This includes the OR Expressions which have at least one unevaluated child. Step 608.

8.2.8 Find Part Known NAND Rules This includes the NAND Expressions which have at least one unevaluated child. Step 608.

8.2.9 Collect New False AND Rules Collect new false AND Expressions to avoid reinsertion. Step 610.

8.2.10 Collect New False NOR Rules Collect new false NOR Expressions to avoid reinsertion. Step 610.

8.2.11 Collect New True OR Rules Collect new false OR Expressions to avoid reinsertion. Step 610.

8.2.12 Collect New True NAND Rules Collect new false NAND Expressions to avoid reinsertion. Step 610.

8.2.13 Find New True AND Rules AND Expressions which do not have any unevaluated children and all the evaluated children are true. If any child was false, this rule would have been selected in 8.2.9. Step 612.

8.2.14 Find New True NOR Rules NOR Expressions which do not have any unevaluated children and all the children are false. If any child was true, this rule would have been selected in 8.2.10. Step 612.

8.2.15 Find New False OR Rules OR Expressions which do not have any unevaluated children and all the children are false. If any child was true, this rule would have been selected in 8.2.11. Step 612.

8.2.16 Find New False NAND Rules NAND Expressions which do not have any unevaluated children and all the children are true. If any child was false, this rule would have been selected in 8.2.12. Step 612.

8.2.17 Combine the results of 8.2.9–8.2.16 to get the new list of True and False Rules. Step 614.

Notice that in steps 8.2.1, 8.2.2, 8.2.5 and 8.2.6 we may find Rules which were already evaluated earlier. Steps 8.2.9 to 8.2.12 eliminate these rules to prevent them from being reinserted into the table. This is to prevent duplicate entries.

Until (8.2.17 produces no new True or False Rules).

This termination is performed automatically by the SQL Query when there are no changes to the table of Rules being evaluated.

Each action may have multiple qualifying rules and each qualifying rule can have multiple actions. FIG. 7 shows an example of a single qualifier rule for an action "TestFix" to help illustrate the invention. The qualifying rule shown in the example is the rTestFixQualifier which has four children. Since the rTestFixQualifier is an AND Rule, all four of the children must evaluate to "true" for the rTestFixQualifier to evaluate to "true". The first child rMNTestFix is an OR expression with four children, if any of the children are "true" rMNTestFix will evaluate to "true". The second child of rTestFixQualifier is tExceptionsTestFix which is a NOR Expression, therefore, all the children of tExceptionsTestFix must be "false" for tExceptionsTestFix to be "true". Some specific test cares are described below.

Test Cases Find the result of evaluating Boolean expressions to compute the Boolean value for rTestFixQualifier

---

1. MODEL_NUMBER=2134C21,PRELOAD_VERSION=NTIT400, BIOS_VERSION=MOKT15AU
    Rule Evaluation 1.1
        Group Aptiva = True because Value 2134C21 = True
        Group gBVTestFix = True because Value MOKT15AU = True
        Group gPVTestFix = True because Value NTIT400 = True
            Rule rAnotherExceptionForTestFix = False because Value
            2134C21 = True and Value
    MOKT15AU = True and Value NTIT400 = True
        Rule rMNTestFix = True because Group Aptiva = True
    Rule Evaluation 1.2 Loop 1
        Rule tExceptionsTestFix = False because Rule
        rAnotherExceptionForTestFix = False
    Rule Evaluation 1.2 Loop 2
        Rule rTestFixQualifier = False because tExceptionsTestFix = False
2. MODEL_NUMBER=2137E51,PRELOAD_VERSION=NTIT400, BIOS_VERSION=MOKT15AU
    Rule Evaluation 1.1
        Group Aptiva = True because Value 2137E51 = True
        Group gBVTestFix = True because Value MOKT15AU = True
        Group gPVTestFix = True because Value NTIT400 = True
        Rule rMNTestFix = True because Group Aptiva = True
        Rule rAnotherExceptionForTestFix = False because Value -continued

```
   2134C21 = False
   Rule tExceptionsTestFix = False because Value 2137E51 is True
   Rule rTestFixQualifier = False because tExceptionsTestFix = False
3. MODEL_NUMBER=2136E12,PRELOAD_VERSION=NTIT400,
BIOS_VERSION=MOKT15AU
   Rule Evaluation 1.1
      Group 2136 = True because Value 2136E12 = True
      Group gBVTestFix = True because Value MOKT15AU = True
      Group gPVTestFix = True because Value NTIT400 = True
      Group Aptiva = True because Group 2136 belongs
      to Aptiva and is True
      Rule rMNTestFix = True because Group Aptiva = True
      Rule rAnotherExceptionForTestFix = False because Value
      2134C21 = False
      Rule tExceptionsTestFix = False because Group 2136 is True
      Rule rTestFixQualifier False because tExceptionsTestFix = False
4.MODEL_NUMBER=2131D0E,PRELOAD_VERSION=NTIT400,
BIOS_VERSION=MOKT15AU
   Rule Evaluation 1.1
      Group gBVTestFix = True because Value MOKT15AU = True
      Group gPVTestFix = True because Value NTIT400 = True
      Rule rMNTestFix = True because Value 2131D0E = True
      Rule rAnotherExceptionForTestFix = False because Value
      2134C21 = False
   Rule Evaluation 1.2 Loop 1
      Rule tExceptionsTestFix = True because all its children are False
   Rule Evaluation 1.2 Loop 2
      Rule rTestFixQualifier = True because all its children are True
5. MODEL_NUMBER=2131D0E,PRELOAD_VERSION=NTIT400,
BIOS_VERSION=NTES400
   Rule Evaluation 1.1
      Group gBVTestFix = False because all its children are False
      Group gPVTestFix = True because Value NTIT400 = True
      Rule rMNTestFix = True because Value 2131D0E = True
      Rule rAnotherExceptionForTestFix = False because Value
      2134C21 = False
      Rule rTestFixQualifier = False because Group gBVTestFix = False
   Rule Evaluation 1.2 Loop 1
      Rule tExceptionsTestFix = True because all its children are False
      Notice how rTestFixQualifier = False before Rule
      tExceptionsTestFix gets evaluated
6. MODEL_NUMBER=86420D0,PRELOAD_VERSION=NTIT400,
BIOS_VERSION=MOKT15AU
   Rule Evaluation 1.1
      Group gBVTestFix = True because Value MOKT15AU = True
      Group gPVTestFix = True because Value NTIT400 = True
      Rule rMNTestFix = False because all children are False
      Rule rAnotherExceptionForTestFix = False because Value
      2134C21 = False
   Rule Evaluation 1.2 Loop 1
      Rule rTestFixQualifier = False because Rule rMNTestFix = False
      Rule tExceptionsTestFix = True because all its children are False
```

Having described preferred embodiments of the present invention for delivering content to clients based on recursive SQL queries, it is noted that modifications and variations can be made by persons skilled in the art in light of the above teachings. It is therefore to be understood that changes may be made in the particular embodiments of the invention disclosed which are within the scope and spirit of the invention as defined by the appended claims.

What is claimed is:

1. A method for delivering an action to a client device comprising the steps of:
   comparing a plurality of client properties describing the client device with a plurality of properties stored in a content server;
   determining a plurality of expressions applicable to the client device according to the comparison;
   evaluating the plurality of expressions according to a recursive Structured Query Language (SQL) query to retrieve applicable qualifying rules; and
   applying the action to the client device, wherein the action is associated with the applicable qualifying rules, and wherein the action installs a software update on the client device changing at least one of the plurality of properties of the client device.

2. The method of claim 1, wherein said properties and expressions utilize Boolean operators.

3. The method of claim 1, wherein the step of evaluating further comprises the steps of:
   determining a plurality of true and false rules from a first level of rules;
   performing nested evaluation of the determined rules; and
   determining whether an additional level exists;
   if an additional level exists, performing nested evaluation of collected rules from the additional level;
   if an additional level does not exist, selecting a plurality of actions associated with true qualifying rules as based on the evaluated rules.

4. The method of claim 3, wherein the step of determining the plurality of true and false rules further comprises the steps of:
   selecting a client's true property values and true property types;
   determining a plurality of true groups recursively;
   determining true NAND groups, true OR rules, and a plurality of true OR rules recursively;
   determining false NOR rules, false AND rules, and a plurality of false AND rules recursively;
   determining a plurality of true base rules for AND and NOR;
   determining a plurality of false base rules for OR and NAND; and
   compiling the true OR rules and the plurality of false base rules for OR and NAND to obtain the first level true and false rules.

5. The method of claim 3, wherein the step of performing nested evaluation of determined rules from the additional level comprises the steps of:
   determining a plurality of false AND rules and a plurality of false NOR rules;
   determining part known AND rules, and part known NOR rules;
   determining a plurality of true OR rules and a plurality of true NAND rules;
   determining part known OR rules, and part known NAND rules;
   compiling new false AND rules;
   compiling new false NOR rules;
   compiling new true OR rules;
   compiling new true NAND rules;
   determining new true AND rules and new true NOR rules;
   determining new false OR rules and new false NAND rules; and
   compiling the new false AND rules, the new false NOR rules, the new true OR rules, the new true NAND rules, the new true AND rules, the new true NOR rules, the new false OR rules, and the new false NAND rules to obtain new True and False Rules for the additional level.

6. A method for providing an action to a client device over a network in response to a Structured Query Language (SQL) query comprising the steps of:
   accepting a plurality of client properties describing the client device;
   comparing the plurality of client properties with a plurality of properties stored in a database having recursive SQL capabilities;

determining a plurality of expressions in the database applicable to the client device according to the SQL query;

evaluating the expressions iteratively to retrieve a plurality of applicable qualifying rules, the qualifying rules associating the expressions with a plurality of actions; and applying the action to the client device, wherein the action is associated with the applicable qualifying rules, and wherein the action installs a software update on the client device changing at least one of the plurality of properties of the client device.

7. The method of claim 6, wherein the step of retrieving qualifying rules further comprises the steps of:

performing a nested evaluation of rules at each level; and selecting a plurality of actions based on the evaluated rules.

8. A computer program product comprising:

a computer usable medium having computer readable program code embodied therein for causing the computer to provide an action to a client device over a network in response to a Structured Query Language (SQL) query, the computer readable program code in the computer program product comprising:

computer readable program code for causing a computer to accept a plurality of client properties describing a client device;

computer readable program code for causing the computer to compare the plurality of client properties with a plurality of properties stored in a database having recursive SQL capabilities;

computer readable program code for causing the computer to determine a plurality of expressions in the database according to the SQL query applicable to the client device; and computer readable program code for causing the computer to evaluate the expressions iteratively to retrieve a plurality of applicable qualifying rules, the qualifying rules associating the expressions with a plurality of actions; and computer readable program code for causing the computer to apply the action to the client device, wherein the action is associated with the applicable qualifying rules, and wherein the action installs a software update on the client device changing at least one of the plurality of properties of the client device.

9. The computer program product of claim 8, wherein the plurality of actions directs a client to retrieve the content from an FTP server.

10. A system connected to a plurality of clients through an electronic network for determining and applying an action upgrading at least one client comprising:

an object relational database management system having a recursive capability for determining the action in response to a Structured Query Language (SQL) query based on elements describing the at least one client, the SQL query evaluating logic expressions linking the elements and the determined action; and a server for receiving a client request specifying the elements, determining the SQL query, and returning the determined action to the at least one client.

11. The system of claim 10, wherein the actions are associated with the logic expressions via dependency rules.

12. The system of claim 10, wherein the SQL query is executed against the object relational database management system.

13. The system of claim 10, wherein the client request comprises a plurality of property values for which the expressions determine the actions.

14. The system of claim 13, wherein the property values comprise:

a property type; and a Boolean operator.

15. The system of claim 14, wherein the property values further comprises comparison operators.

16. The system of claim 14, wherein the logic expressions comprise Boolean operators, and the expression evaluates the Boolean property value to one of true and false.

17. The system of claim 10, wherein upon returning the action to the at least one client, the action updates software of the at least one client.

* * * * *